(12) United States Patent
Larsen et al.

(10) Patent No.: US 8,208,473 B2
(45) Date of Patent: Jun. 26, 2012

(54) IMPLIED ACKNOWLEDGEMENT DATA TRANSPORT PROTOCOL FOR A MULTI-STATION NETWORK

(75) Inventors: James David Larsen, Woodinville, WA (US); Paul Jonathan Rodman, Kirkland, WA (US)

(73) Assignee: Iwics Inc., Bothell, WA (US)

( * ) Notice: Subject to any disclaimer, the term of this patent is extended or adjusted under 35 U.S.C. 154(b) by 17 days.

(21) Appl. No.: 11/578,438

(22) PCT Filed: Oct. 21, 2005

(86) PCT No.: PCT/IB2005/003141
§ 371 (c)(1),
(2), (4) Date: Jun. 7, 2007

(87) PCT Pub. No.: WO2006/043161
PCT Pub. Date: Apr. 27, 2006

(65) Prior Publication Data
US 2007/0280262 A1  Dec. 6, 2007

(51) Int. Cl.
*H04L 12/28* (2006.01)
(52) U.S. Cl. .................... 370/394; 370/322
(58) Field of Classification Search .................. 370/278, 370/254, 312, 337, 317, 346, 347, 349, 318, 370/229, 230, 231–235, 395, 397, 400, 406, 370/413, 466, 255, 351
See application file for complete search history.

(56) References Cited

U.S. PATENT DOCUMENTS
2001/0036810 A1  11/2001  Larsen
2005/0135242 A1   6/2005  Larsen et al.

FOREIGN PATENT DOCUMENTS
WO  WO 96/19887      6/1996
WO  WO 98/56140     12/1998
WO  WO 9856140 A2 * 12/1998

OTHER PUBLICATIONS
Textbook, communication Neworks, fundamental concepts and key architectures, Alberto Leon-Garcia, Indra Widjaja, McGraw Hill, higher education, second edition, 20004, pp. 300,301, 305,306 ISBN: 0-07-246352-X.*

* cited by examiner

*Primary Examiner* — Chi Pham
*Assistant Examiner* — Kouroush Mohebbi
(74) *Attorney, Agent, or Firm* — Ladas & Parry LLP (57) ABSTRACT

A method of operating a communication network having multiple stations, each able to transmit and receive data, so that the network can transmit a message from an originating station to a destination station via at least one opportunistically selected intermediate station. Stations wishing to transmit data transmit probe signals which are responded to by other stations, thereby to identify available stations. When a station has data to send, it transmits probe signals with Request to Send messages, identifying the data to be sent. When a station receives such data for onward transmission, it transmits its own probe signals with a Request to Send message and including identification information relating to the data. The Request to Send messages are received by other stations in the vicinity, so that they serve as an implied acknowledgement of the receipt of the data by the forwarding station without the need for sending explicit confirmation.

20 Claims, 6 Drawing Sheets

ODMA System Level Architecture

Fig. 7

IMPLIED ACKNOWLEDGEMENT DATA TRANSPORT PROTOCOL FOR A MULTI-STATION NETWORK

BACKGROUND OF THE INVENTION

THIS invention relates to a method of operating a multi-station communication network of the general kind described in International Patent applications nos. WO 96/19887 and WO 98/56140. In particular, the invention relates to a data transport protocol for use by such a network.

Networks of the kind referred to above can be utilised commercially, with users being subscribers who are billed for their use of the network. Alternatively, networks of this kind may be utilised by security forces such as police or military forces.

A further application for networks of the kind referred to is in Wireless Local Area Networks (WLANs), where a wireless network can be combined with conventional network structures to service fixed and mobile network users. Such networks are usually but not necessarily computer networks.

SUMMARY OF THE INVENTION

According to the invention there is provided a method of operating a communication network comprising a plurality of stations each able to transmit and receive data so that the network can transmit a message from an originating station to a destination station via at least one opportunistically selected intermediate station, the method comprising:

transmitting probe signals from each station, other stations which receive the probe signals from a probing station responding directly, or indirectly via other stations, to indicate to the probing station their availability as destination or intermediate stations;

from a station with data to send, transmitting a probe signal comprising a Request to Send message to other available stations, the Request to Send message indicating a need to send data to a particular destination station or stations and including identification information relating to data received previously for onward transmission by the station with data to send;

from said station with data to send, transmitting data opportunistically to reach a station or stations for onward transmission to said destination station or stations; and from a station receiving said data for onward transmission, transmitting a further probe signal comprising a Request to Send message including identification information relating to said data, thereby to provide an implied acknowledgement of the received data to the station with data to send and to other available stations.

As multiple stations could have received the data for onward transmission, the transmission of a Request to Send in a further probe signal from each station forwarding the data will send an implied acknowledgement of receipt of the data to all other stations that receive it, including the station which transmitted the data. This will prevent too many stations sending copies of the data forward. This is a kind of limited flood process as the data is transmitted (at least potentially) to multiple stations, which all transmit their own probe signals comprising Request to Send messages, and send the data onward to further multiple stations. The use of the Request to Send messages limits the flooding effect.

Preferably, when the station with data to send transmits said probe signal comprising a Request to Send message, only stations having a lower cost to destination than the station with data to send respond to said probe signal to indicate their availability as destination or intermediate stations.

Accordingly, the data to be sent is transmitted from station to station as required, with each further station having a lower cost to destination than the previous station.

If a station with a higher cost to destination hears a Request to Send message from another station with a lower cost to destination, relating to the same data, it will treat the data as acknowledged.

Thus, a station forwarding data from an originating station towards a destination station does not need to transmit a specific acknowledgement message to a station from which data was received. Instead, by including information relating to the received data in its own Request to Send messages, in probe signals that are transmitted as part of a process of identifying available stations nearby and are received by, inter alia, the station that transmitted the data, the station forwarding the data implicitly acknowledges receipt of the data.

The method has particular application in a network comprising a plurality of client stations and one or more gateways arranged to serve as access points to the network for client stations.

Such a network may include a plurality of seed stations with which client stations can communicate, the plurality of seed stations extending the effective connectivity range of the client stations, and may further include at least one subscriber network manager for monitoring the client stations.

The message data transmitted from the originating station will typically comprise a plurality of data packets.

The method may include selecting, at each station, a probing channel distinct from one or more data channels for the transmission of probe signals to other stations.

The Request to Send messages may include message data, for example high-priority message data, so that stations may effectively communicate high priority information via the mechanism of probe signals transmitted on a probing channel, without having to transmit data on a data channel.

Message data included in Request to Send messages will preferably comprise a relatively small or limited amount of data compared with the amount of data in other data transmissions of the method.

This option speeds up the communication process as it can happen on the probing channel. This is useful for small amounts of high priority data that need to move quickly across the network, as it avoids the delay of a channel change.

The Request to Send message sent by the station receiving said data for onward transmission may comprise dummy information where the receiving station has no message data to send requiring a Request to Send message, thereby to provide an implied acknowledgement of the received data to the station with data to send.

The method may include transmitting, from each destination station which has received all data packets of a message, an End-to-End Acknowledgement to the originating station, contained in a Request to Send message.

Each originating station preferably retains all the data packets of the message until the originating station receives the End-to-End Acknowledgement from the destination station.

Additionally, each destination station may retain all the data packets of the message until the destination station transmits the End-to-End Acknowledgement to the originating station.

Preferably each station with data to send retains at least one data packet until the station with data to send has transmitted said at least one data packet to a receiving station and until the receiving station confirms successful reception of the transmitted data packet by transmitting a Request to Send message containing information relating to said transmitted data packet.

Where a station has a large amount of data to send, it may transmit a Request to Send message requesting an available station to send a Clear to Send message in order to notify the station with data to send that there is a station ready to receive the transmission, the station with data to send and the station sending the Clear to Send message switching to a data channel for transmission of the data.

In the above case, said Request to Send message may include data specifying criteria limiting the need for other stations to return a Clear to Send message.

For example, the criteria may include one or more of: a list of stations that are permitted to answer; and a requirement that only stations receiving said Request to Send message that have a lower cost to destination than the station with data to send are to respond.

The invention extends to a communication network comprising a plurality of stations each able to transmit and receive data so that the network can transmit a message from an originating station to a destination station via at least one opportunistically selected intermediate station, wherein each station in the network is adapted to:
  transmit probe signals, other stations which receive the probe signals from a probing station responding directly, or indirectly via other stations, to indicate to the probing station their availability as destination or intermediate stations;
  transmit a probe signal comprising a Request to Send message to other available stations when the station has data to send, the Request to Send message indicating a need to send data to a particular destination station or stations and including identification information relating to data received previously for onward transmission by the station with data to send;
  transmit said data opportunistically to reach an available station or stations for onward transmission to said destination station or stations; and
  transmit a further probe signal comprising a Request to Send message including identification information relating to said data when the station receives data for onward transmission, thereby to provide an implied acknowledgement of the received data to the station with data to send and to other available stations.

DESCRIPTION OF AN EMBODIMENT

The present invention relates to a method of operating a multi-station communication network of the kind described in International patent applications nos. WO 96/19887 and WO 98/56140, the contents of which are incorporated herein by reference. In brief, the basic operation of such a network is as follows.

The multi-station network comprises a number of independent stations, which may be fixed or mobile, each of which can transmit and receive data in order to transmit messages from originating stations to destination stations opportunistically via intermediate stations. In order for an originating station to be in a position to send a new message to a destination station via a selected one of several possible intermediate stations, each station must at any time normally be in contact with several other stations. This applies also to the case where stations are required to relay a message from an originating station to a destination station.

In order to do this, each station selects one of a number of possible probing channels to transmit probe signals to other stations. The probe signals contain data identifying the station in question and include details of its connectivity to other stations. Other stations receiving the probe signals respond directly to the probing station or indirectly, via intermediate stations, thereby indicating both to the probing station and other stations their availability as destination or intermediate stations. The probing station evaluates the direct or indirect responses to identify other stations with which it can communicate optimally.

In particular, the stations of the network may monitor the cumulative power required to reach another station, thereby defining a power gradient to the other stations, with stations selecting a route through the network between an originating station and a destination station which optimizes the power gradient. This enables data throughput through the network to be maximized, with minimum interference and contention between stations.

Each station in the network comprises a transceiver able to receive data from and transmit data to any other station within range. The network could be a packet radio network, as described in the above mentioned International patent applications, but it will be appreciated that the invention is applicable to other networks in which user stations can communicate with one another via intermediate stations in the network.

The above described method of opportunistic data transmission between stations of a network is referred to herein as Opportunity Driven Multiple Access (ODMA).

An embodiment of the present invention will now be described with reference to a WLAN system based on the 802.11b standard. An example of such a WLAN arrangement is illustrated in the schematic diagram of FIG. 1.

Figure 1:
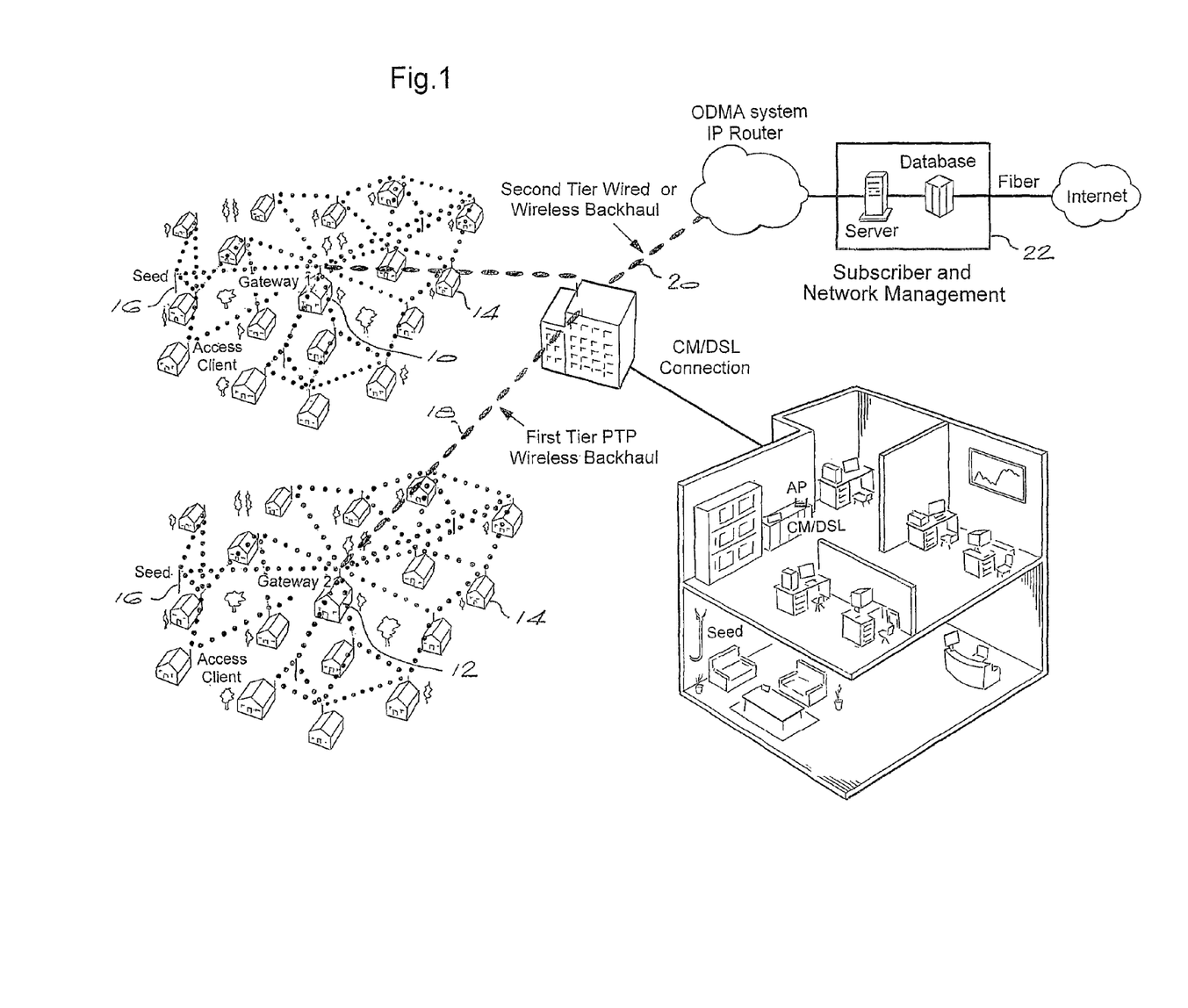
FIG. 1 is an overall system diagram showing a WLAN network utilising the method and system of the present invention.

In FIG. 1, first and second gateways 10 and 12 each serve as an access point to the network for a number of subscriber units or client devices 14, referred to generally as client stations below. The client stations in this embodiment will typically comprise wireless network cards which can communicate with the respective gateways 10 and 12 either directly, or indirectly via other client devices, using ODMA techniques. In addition, a number of seed stations 16, typically wireless routers, are deployed strategically near the gateways 10 and 12. The seed stations effectively extend the coverage range and throughput of the network by extending the connectivity range of the client stations, particularly in difficult environments or in environments with a low density of client stations.

ODMA protocols can operate over wireless links to relay data opportunistically between client stations and seed stations, over wired networks such as local area networks, and the wireless backhaul or fibre links 18 and 20 shown in FIG. 1. The relaying from station to station may involve wired and wireless hops and hops via wireless backhaul as shown.

The network opportunistically routes messages wirelessly from subscriber to subscriber (client station to client station) and via seed stations into gateways and then via point to point links into fibre, into another region.

In this way a national and international network using ODMA, via the various types of network, can allow messages to be passed from any network user to any other user in any part of the world. The network will automatically find optimal paths for the message packets to follow and provide load balancing and healing of broken links by finding alternate paths through the network. All units in the ODMA network have unique addresses called SID (System ID).

A subscriber network manager 22 monitors the health of the various stations in the network and manages the security and billing of the network.

In the above described example, the client stations can communicate with the gateways 10 and 12, either directly, via the seed stations 16, or via one or more intermediate client stations, in the manner described in the abovementioned International patent applications. In addition, the client stations can form instant, peer-to-peer networks with other similar devices.

The use of opportunistic multi-hop routing in a network of this kind improves network robustness, as client stations can hop to alternate gateways if their current gateway fails, and tends to eliminate bottlenecks and improve overall network performance. In conventional 802.11b systems, the range tends to be reduced drastically, typically to less than a hundred meters. In order to increase coverage to distant client stations the data rate must be reduced. In turn, the use of a low data rate causes client stations to stay on the data channel for longer, so that throughput suffers for all client stations of the WLAN. The use of opportunistic multi-hop routing solves this problem, since even distant client stations can, using multiple hops at the highest data rate through seed stations and neighboring client stations, transmit data to a destination, avoiding network congestion. The optimal use of channels and power adaptation reduces contention and optimizes the throughput offered to the users.

Figure 2:
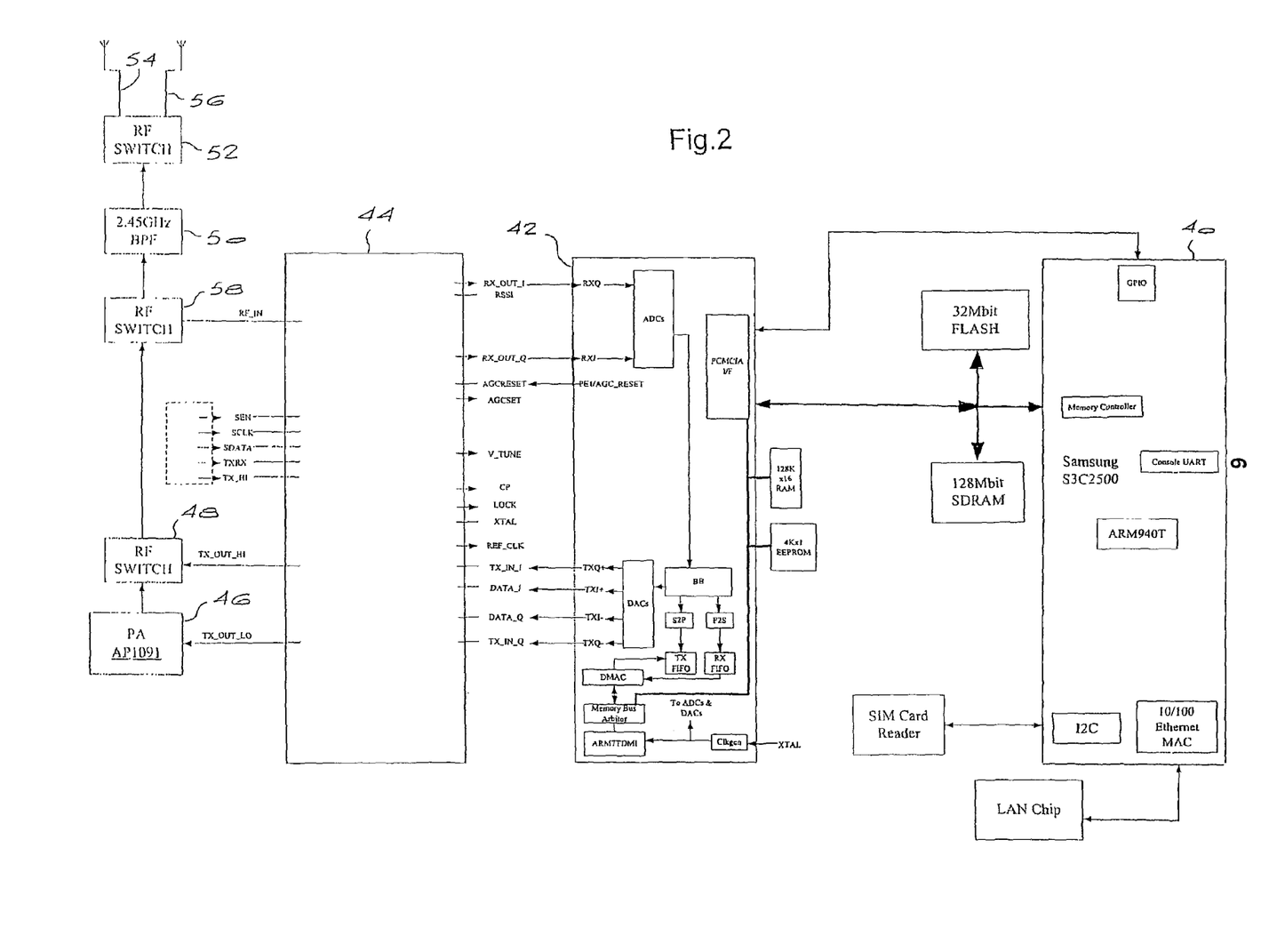
FIG. 2 is a schematic block diagram of a client station used in the network of FIG. 1.

FIG. 2 shows a schematic block diagram of a client station forming part of an 802.11b WLAN. The client station includes a Samsung S3C2500 microcontroller 40 with ARM940T RISC embedded. It also provides 10/100 Mbps Ethernet Controllers, a Memory Controller, I2C and GPIOs to communicate with a LAN chip, a SIM card reader and a ZD1201 Base-Band Processor. The S3C2500 chip is equipped with 32 Mbit Flash and 128 Mbit SDRAM memory.

The station includes a highly-integrated ZD1201 WLAN combination chip 42 which uses high speed DSP hardware logic to perform 802.11 and 802.11b baseband modulation and demodulation. To follow up the future MAC standards defined by IEEE 802.11 group, an ARM7 RISC processor is embedded in the ZD1201 chip. This permits use of the latest WLAN features by simply upgrading the software drivers.

The client station includes a SA2400 fully integrated single IC RF transceiver 44 designed for 2.45 GHz wireless LAN (WLAN) applications. It is a direct conversion radio architecture that is fabricated on an advanced 30 GHz fT BiCMOS process. The SA2400A combines a receiver, transmitter and LO generation into a single IC. The receiver consists of a low-noise amplifier, down-conversion mixers, fully integrated channel filters, and an Automatic Gain Control (AGC) with an on-chip closed loop. The transmitter contains power ramping, filters, up-conversion, and pre-drivers. The LO generation is formed by an entirely on-chip VCO and a fractional-N synthesizer. Typical system performance parameters for the receiver are 93 dB gain, 7.5 dB noise figure, input-referred third-order intercept point (IIP3) of +1 dBm, AGC settling time of 8 ms, and TX-to-Rx switching time of 3 ms. The transmitter typical system performance parameters are an output power range from −7 dBm to +8 dBm in 1 dB steps, −40 dBc carrier leakage after calibration, 22 dB sideband suppression, in-band common mode rejection of 30 dB, and Rx-to-Tx switching time of 3 ms.

The station comprises a power amplifier stage in the form of an AP1091 linear, two stage power amplifier 46 with high output power in the 2.4 GHz band. The station delivers 26 dBm of linear output power compliant with the IEEE802.11b standard. The power amplifier also includes an on-chip power detector, providing a DC voltage proportional to the output power of the station.

The station further includes a DC-3 GHz SPDTRF switch 48, which has low insertion loss and positive voltage operation with very low DC power consumption.

A first RF switch 52 close to the antennas 54 and 56 provides the ability to choose which antenna is used for transmission or reception. From the selected antenna, the received input is applied to a 2.45 GHz bandpass filter 50. This filter rejects interferers outside the 2.4 GHz ISM band. A second RF switch 58 close to the 2.45 GHz bandpass filter provides TX/RX switching. This switch in receive mode leads the signal into the LNA section of the SA2400. Next, the signal is mixed down to baseband with the quadrature downconverter into the I and Q components. Finally, the signal goes to the ADC's of the ZD1201. The baseband circuit samples the waveform and then despreads and demodulates the received data.

On the transmit link, data can be DBPSK, DQPSK or CCK modulated, resulting in a baseband quadrature signal with I and Q components. The signals then go to the input of the upconverting mixer for conversion to the 2.4 GHz-2.5 GHz band. The SA2400 is operated in either high-power mode or low-power mode to cover a high output power range. When operated in high-power mode, the TX_OUT_LO is selected and goes to the AP1091 amplifier to provide high output power. When operated in low-power mode, the TX_OUT_HI is selected and the signal goes through the RF switch directly. Note that a TX AGC function is provided by the ZD1201 Base-Band Processor 42.

Figure 3:
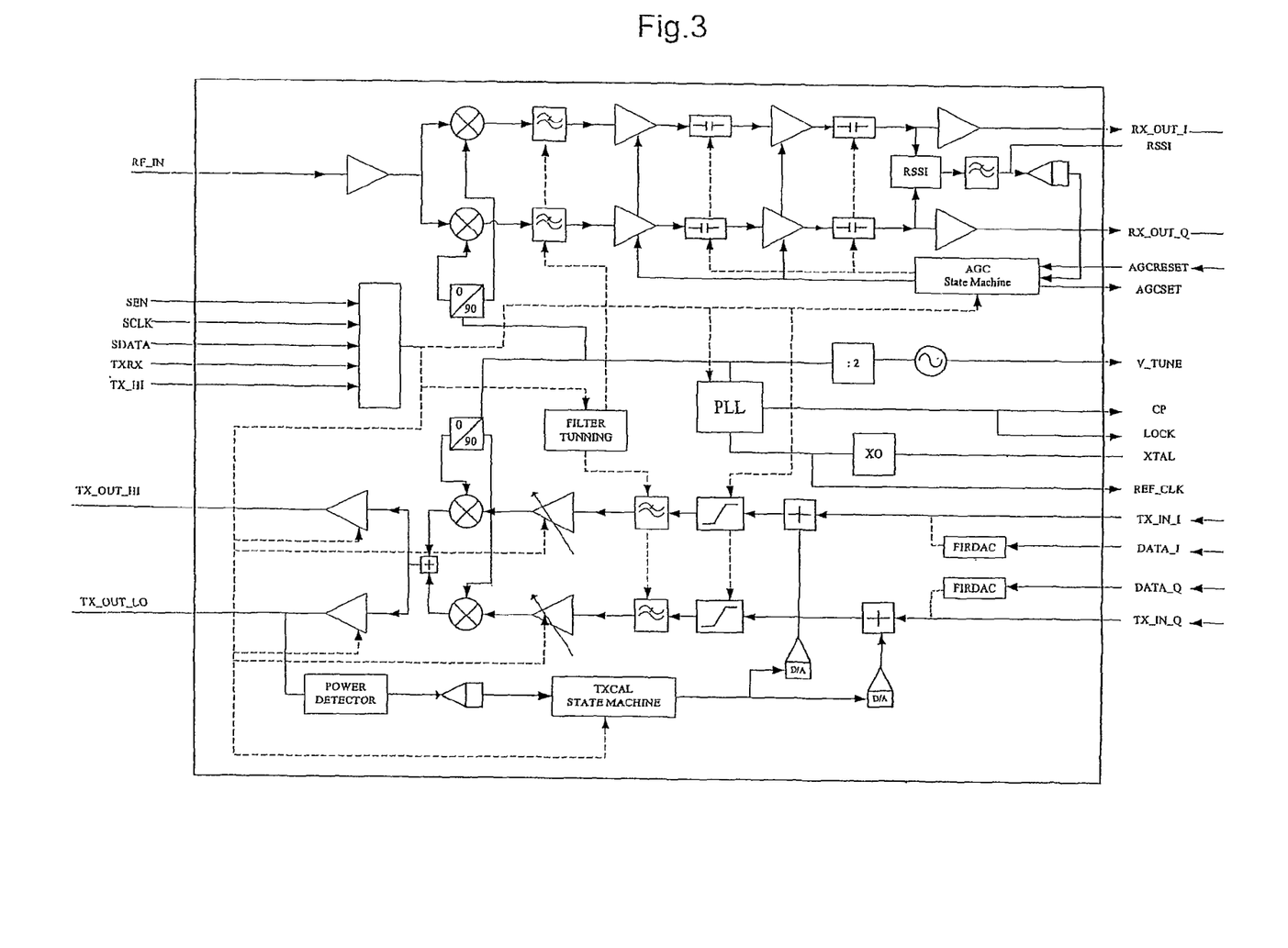
FIG. 3 is a detailed schematic diagram of a single chip transceiver used in the station of FIG. 2.

The internal circuit of the SA 2400 transceiver is shown in the more detailed schematic diagram of FIG. 3.

Figure 4:
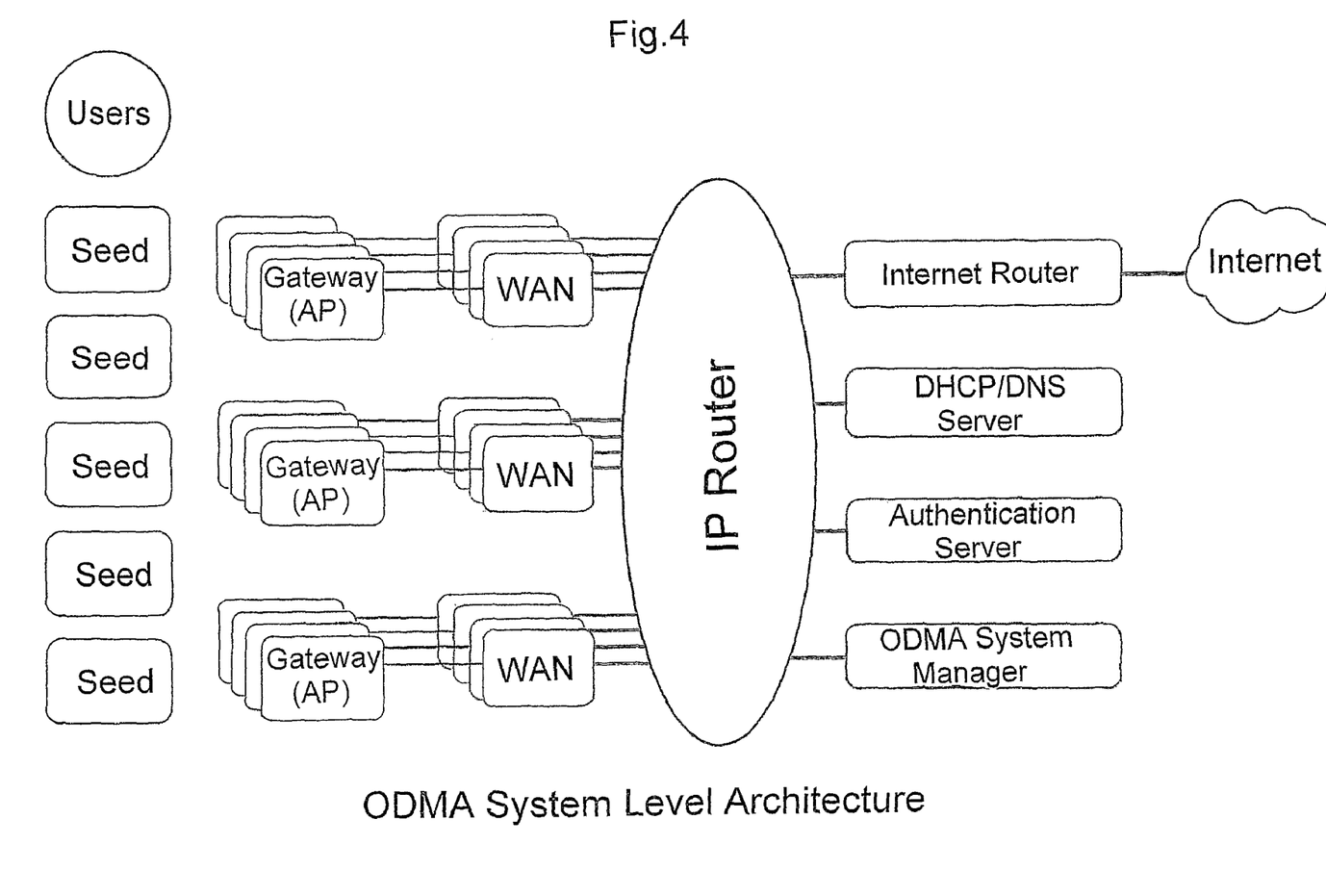
FIG. 4 is a schematic diagram of the system level architecture of the network of FIG. 1.

FIG. 4 shows the system level architecture of the network of FIG. 1. The system essentially comprises subscriber units or users (client devices or stations), seed stations, and gateways that link the client stations to a WAN. The client stations can communicate with each other by relaying messages directly between themselves or via the seed stations. If a user wants to access other networks such as the Internet the messages are relayed to the WAN via a gateway and then a router network into the other networks. The gateways act as translators from the ODMA protocols used by the client stations and seed stations to other protocols such as TCP/IP.

The operation of the above described network will now be described with reference to the schematic diagrams of FIGS. 5 to 9.

Figure 5:
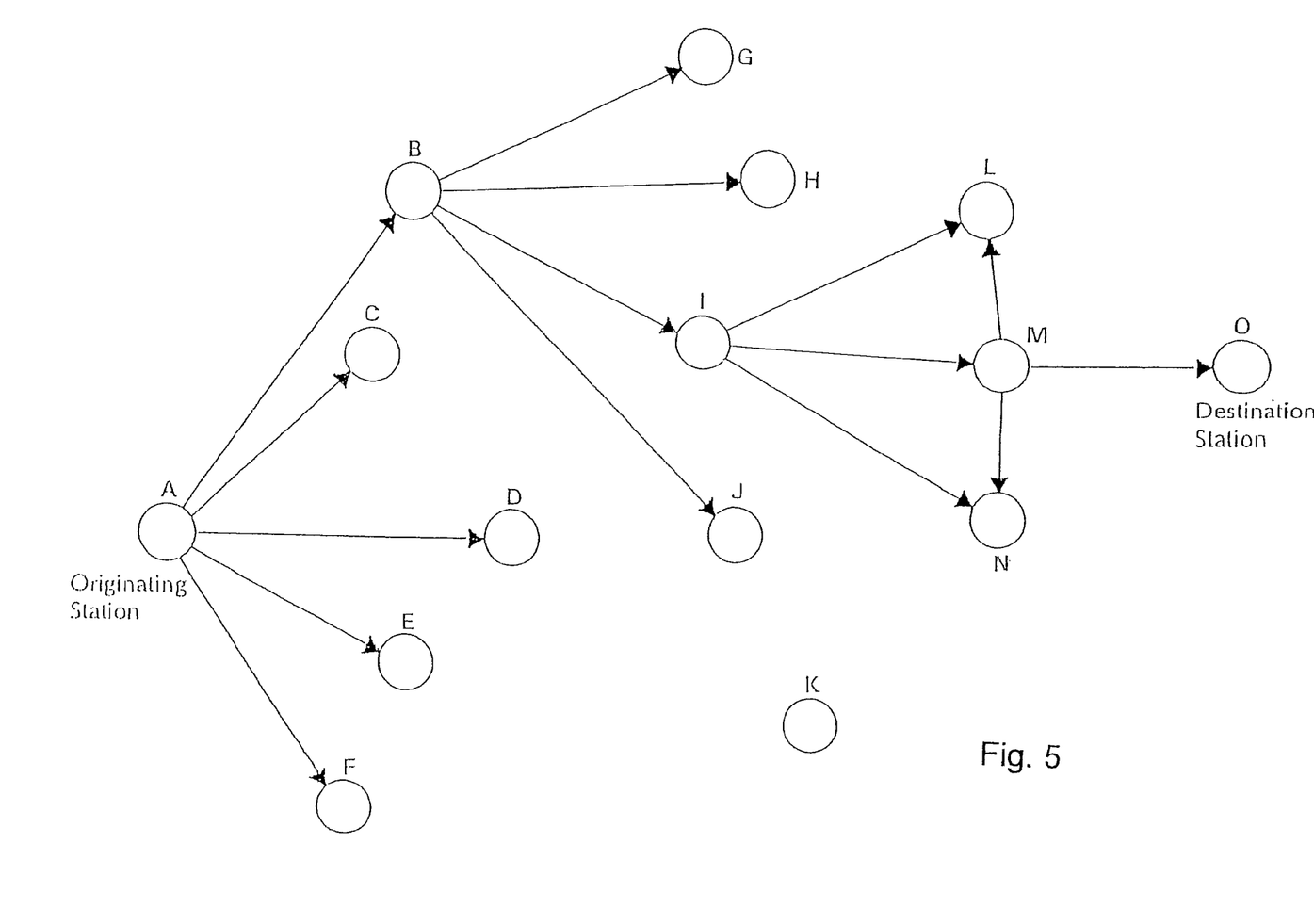
FIG. 5 is a schematic diagram of a network of the invention, in which stations communicate with one another via intermediate stations.

In FIG. 5, an originating station A is able to communicate with five "nearby" stations B to F, and is transmitting data to a destination station O via intermediate stations B, I and M. The stations A to M and O will generally be user stations comprising client stations as described above, but some may be seed stations, for example.

In order to maximize the efficiency of the network, it is desirable that each station should have a number of "neighbor" stations with which it can communicate, in case that station needs to send or receive a message. On the other hand, if a given station is transmitting data to a selected neighbor station, it is desirable that the transmission should cause the minimum of interference to other stations, otherwise the resulting contention between stations will reduce the amount of data throughput in the network.

With the above in mind, the present network seeks to adjust the operation of each station so that it can at any time send data to or receive data from a number of neighbor stations, at the highest possible data rate but at the lowest possible transmitted power, thus reducing interference with other stations.

A communication network of the kind in question comprises many stations trying to communicate on the same set of channels. The channels can be defined as having different frequencies, different media, different coding (eg. different spreading codes), different antennas, different time slots etc., or any combination of these. In order to optimize channel re-use, the stations try to maintain a limited number of immediate neighbors, typically 5 neighbors. A neighbor is defined as another station that a given station can communicate with.

A station can limit the number of neighbors it sees or that see it by changing its transmission frequency, changing code (PN Sequence), increasing its data rate, and dropping its transmit power. All stations will gather at predefined Probing Channels where they will find other stations to communicate with, using probe signals. Once another station is found and either of the stations have data to send to the other they may then move to a less used Data Channel.

The method of the present invention uses two kinds of probing processes, "slow probing" and "fast probing". These probing systems have been described in detail in U.S. Patent Application No. 60/531,309 entitled "Probing Method for a Multi-Station Network" also filed by the applicant, the content of which is hereby incorporated by reference. However, for the sake of completeness, the following information is repeated.

The slow probing process is used by each network station to gather neighbors, while the fast probing process is used to construct gradients between originating and destination stations.

Dealing first with the slow probing process, when there are a number of stations in close proximity they will end up probing at higher data rates and low transmit powers. Stations will occasionally respond to stations that are on probing at the lower data rates or that do not have enough neighbors to help any lonely (distant) stations (also referred to below as lonely neighbors) that cannot use the higher data rates or do not have sufficient neighbors. Stations will only use the lower data rates when they are lonely and cannot find sufficient neighbors at the higher data rates and at maximum power.

Each station will transmit slow probe signals at regular intervals (determined by a Slow Probe Timer) trying to find other stations. Stations indicate in their slow probes that they are able to detect other stations probing and in that way stations will vary their probe power until a certain predetermined number of stations indicate they are able to detect the probes. If a station never acquires the required number of neighbors it will remain at the lowest data rate and maximum transmit power Each station will randomly vary the Slow Probe Timer slightly between slow probe signal transmissions to avoid collision with other stations. Should any station start receiving another station's transmission, it will reload the Slow Probe Timer with a new interval.

In a network of mobile stations the stations are constantly moving, and as such the number of neighbors will constantly be changing. If the number of neighbors exceeds the required number a station will start to increase its data rate on the probing channel. It will continue to increase its data rate until it no longer exceeds the required number of neighbors. If it reaches the maximum data rate it will start to drop its slow probe transmit power by 10 dB increments until it either reaches the minimum transmit power, or no longer exceeds the required number of neighbors.

When a station replies to another station's slow probe on a Probing Channel it will limit the length of its data packet to the Slow Probe Timer interval. This is to avoid other stations probing over its reply. If the station that is replying has more data to send than will fit in a small packet it will indicate in the header of the packet that the other station must move to a specific Data Channel.

There can be a number of Data Channels defined for each Probing Channel. The station that is requesting the change will randomly select one of the available Data Channels. (When the other station receives the request it will immediately change to that Data Channel, where the two stations will continue to communicate until neither of them have any data to send, or if the maximum time for remaining on the Data Channel expires (set by a Data Timer). Alternative data transport protocols could also be used.

When a station changes to the Data Channel it loads the Data Timer. It will remain on the Data Channel for as long as the Data Timer will allow. When the Data Timer expires the stations will revert back to the Probing Channel and start probing again.

Figure 6:
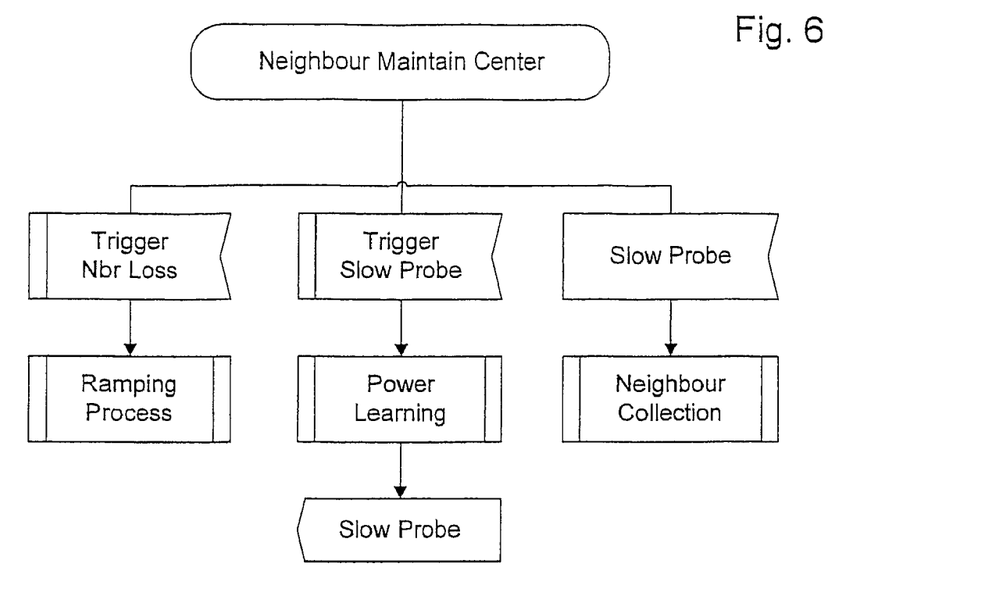
FIG. 6 is a simplified schematic diagram illustrating a slow probing method used by the network to gather neighbors.
Figure 7:
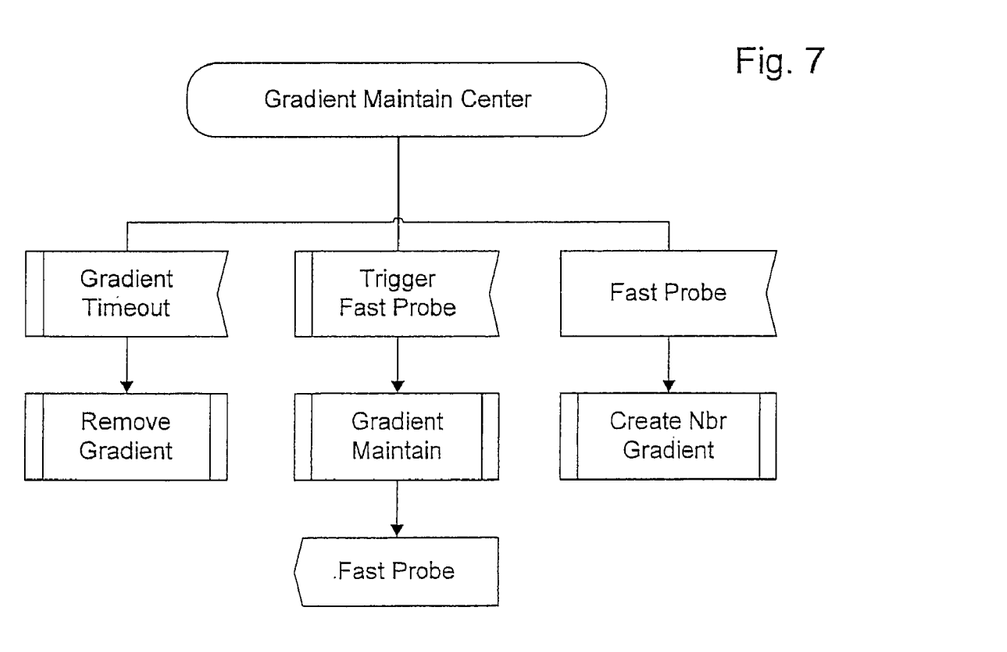
FIG. 7 is a simplified schematic diagram illustrating a fast probing method used by the network to maintain cost gradients between stations.

The schematic diagram of FIG. 6 illustrates the slow probing process of the invention.

The slow probing process consists of three basic functions:
1. Neighbor collection
2. Power learning
3. Ramping of neighbors The process of neighbor collection consists of a station probing at increased levels of power until neighboring stations indicate in their own probes that they are detecting the probes of the first station. This is called neighbor collection. The power of the probe is increased until a predetermined number of neighbors indicate that they are detecting the probes.

All probing stations increase and decrease their probe power until all stations have collected a predetermined number of neighbors. This process consists of increasing and decreasing the power level of probes and indicating in probes which other stations' probes are heard. In this way all stations can learn what power level they require to reach various neighbors. Each time a station probes it indicates its transmit power and noise floor and which stations it has as neighbors. Every time a station hears another station probe it calculates from the probe the path loss and power required to reach the station from the path loss and the noise floor of that station. The path loss to the neighbor and the power required to reach the neighbor is stored in a table kept at each station called a neighbor table. If a neighbor is no longer heard then the path loss and power level required to reach the station is increased or "ramped" in the table until a certain level is reached at which point the neighbor is removed from the neighbor table.

The slow probing process of the invention is described in more detail in the following example:

Slow Probing Parameters
Min Probing Power (PPmin)
Max Probing Power (PPmax)
Probing Power step (PPstep)
Probing Interval (Pint)
Probing Interval standard deviation (Psdev)
Probing Intervals per power step (nPPs)

Neighbor Timeout interval (TNint)
Close Neighbor Timeout interval (TCNint) (TCNint<TNint)
Number of close neighbors to gather (nNbrs)
Max number of neighbors to include in a probe (nPNbrs)
Station noise floor (Nfloor)
Loss ramping time (tinc)
Loss ramp increment (Linc) (dB)
Loss ramp excess (Lex) (dB)
Types of Message
Probe
Probe Ack
Definitions
Neighbor: a station that has transmitted a Probe or Probe Ack that can be seen at this station.
Close Neighbor: a Neighbor that has transmitted a Probe that contains this station's ID.
Protocol (For Each Station)

At regular intervals (Pint+/−Psdev) each station sends out a Probe. Initially transmit at power PPmin. At each nPPs intervals increase power by PPstep until at least nNbrs Close Neighbors have been found (they have responded with this station's ID in their Probe messages) or the power reaches PPmax (at which stage continue Probe transmissions at this power level). If more than nNbrs Close Neighbors can be seen, start ramping the power back down.

A Probe consists of the following information:
 a. The noise floor at this station (Nfloor).
 b. The transmit power of this probe message.
 c. The total number of Neighbors of this station (not used at present).
 d. The total number of Close Neighbors of this station.
 e. The station IDs of the nearest nPNbrs (or fewer) Neighbors (or possibly all Neighbors—an option).

(The nearness of a Neighbor is based on the received power of that Neighbor's last Probe message)

When not probing, the station is listening for Probes (or Probe Acks) from other stations. When another station's Probe is heard, the transmit power information in the Probe message is used to determine the path loss to that station. The noise floor information is then used to determine the minimum transmit power needed to send a message to that station and the Neighbor table updated suitably.

If a station is heard that:
 (a) is transmitting its Probe at PPmax power,
 (b) claims to have fewer than nNbrs Close Neighbors,
 (c) is not one of the Close Neighbors of this station and
 (d) that this station can communicate with,
then the remote station is considered a "Lonely Neighbor". In this case immediately (+/−Psdev) send a Probe Ack message at a suitable power that it can be heard by the remote station.

The Probe Ack contains the following information:
 a. The noise floor at this station
 b. The transmission power of this Probe Ack message
 c. The station ID of the "Lonely Neighbor"

If this station hears a Probe Ack message containing this station's ID, then the transmitting station is tagged as a Close Neighbor.

If a neighbor table entry is not updated (by probes from that neighbor) after time tinc, add Linc to the reported loss in the entry. Repeat this (add Linc to the reported loss in the entry) at intervals of tinc until either the entry is updated by a probe, or until the transmit power required to reach the neighbor using the reported loss exceeds the maximum permitted power by Lex dB. In the latter case set the loss to infinity.

If the loss is at infinity and no entries exist in the gradient table involving the neighbor, then the neighbor table entry should be deleted.

If a Probe/Probe Ack is not heard from a Neighbor for TNint then drop the Neighbor. If a Probe/Probe Ack is not heard from a Close Neighbor for TCNint then revert the Close Neighbor back to Neighbor status.

The cost to a particular neighbor can be calculated in terms of the transmit power to reach the neighbor.

For example less than −10 dBm=cost 1
Less than 0 dBm=Cost 2
Less than 10 dBm=Cost 3
Less than 17 dBm=Cost 4

The cost is an indication of the power required to reach a neighbor. The more power required the more interference, and the higher the cost in terms of power (battery) consumption etc.

If all the costs for multiple hops are added together then the total cost is an indication of how much power would be used, or interference generated, if a message followed those hops.

The slow probe develops an indication of the power required to reach neighbors.

If a station has a message for a destination that is not one of its neighbors, for example, a distant station across the network, it begins to transmit fast probe signals to develop information on how to reach the destination. The information is called a gradient and is an indication of the cumulative cost to reach a destination. When a station starts to fast probe it indicates that it is looking for a destination and neighbors hearing the fast probe will fast probe themselves until the destination hears the fast probes of its neighbors. The gradient is then built through adding cumulative cost until the gradient reaches the source, and the source can commence to send messages to neighbors that have lower gradients to destination, which in turn can send them to their neighbors until the destination is reached. The gradients both to and from the source to destination are constructed. The fast probe process is illustrated concisely in FIG. 7.

Each station keeps a record of the (cumulative cost) gradients to and from each destination of each of its neighbors, and its own gradient to and from the destination. Each station only passes messages to stations with a lower cumulative cost to destination. A station can pass a message to any of its neighbors with a lower gradient to destination than its own. Neighbor gathering via slow probing and gradient generation via fast probing allow a station to develop a number of choices of stations with lower cost to any destination that can send messages to such destinations. The neighbors are maintained all the time via slow probing and gradients are only developed on a needs basis when messages need to be sent to stations that are not neighbors.

The method of the invention provides an alternative data transport algorithm which uses implied acknowledgements of receipt of data sent between the different neighbor stations.

In previous systems disclosed, a station with data to transmit would transmit a Request to Send (RTS) message. An available station would then transmit a Clear to Send (CTS) message as a reply, with the station with data to send then opportunistically selecting an available station, transmitting the data and the station receiving the data then transmitting a Packet Acknowledge message to confirm successful reception of the transmitted data packet.

The present data transport protocol is simplified; with a station with data to send not waiting to receive a Clear to Send (CTS) message from an available station but transmitting the data as soon as it has sent a Request to Send (RTS) message. (The RTS may include a small amount of data. This is especially relevant where only a relatively small amount of data is to be transmitted between the stations.)

This protocol can be used with systems where data is transmitted on a separate data channel or on the probing channel itself. The description below assumes that a separate data channel is used.

As will be described in more detail, this data transport protocol provides for the inclusion of information relating to data packets which have been received by a specific station in the subsequent RTS messages sent by that station. Stations listening to these RTS messages, and in particular the station which has previously sent a data packet, are provided with an implied acknowledgement (i.e. information relating to receipt of the sent data packets) in an RTS message of another station, that the particular data packet sent by the station has been received by an available station.

The data transport protocol according to this invention also uses End-to-End Acknowledgements (ETE ACK) and End-to-End Non-Acknowledgements (ETE NAK) between stations to indicate whether a destination station has received a message. Typically, once the entire message (i.e. all data packets) has been received by a destination station, an ETE ACK is transmitted back to the message originating station by including the information (ETE ACK/NAK) in outgoing RTS transmissions from stations. This special acknowledgement is generated at the destination to tell the source that all packets of a message were received and delivered.

Algorithm

A message or block of data must be broken into smaller blocks or data packets of length not exceeding Psize. Each packet is numbered from 1 to Nmsg, where Nmsg is the number of packets required. Typically the last packet (numbered Nmsg) will be smaller than Psize. These data packets are added to the message queue at the originating station.

Associated with each data packet are six items:
(1) the originating station ID;
(2) the destination station ID;
(3) a message ID, unique to the originating station;
(4) the packet number (between 1 and Nmsg);
(5) Nmsg (i.e. the number of packets required); and
(6) Time to live (initialized to TTL).

If the packets of a message residing at the destination of that message have a time-to-live that falls below TTL-Tnak, then an End-to-End Non-Acknowledgement (ETE NAK) is generated targeted at the message's source station and containing a list of the missing packet/s. As mentioned, this ETE NAK is included in the information of outgoing RTS transmissions which is generated at a message destination to request the source to retransmit one or more packets of the message.

It should be noted that packet generation at a station starts the process of fast probing (if not already in progress). An End-to-End ACK received at the originating or source station typically causes the gradients to be dropped.

The originating station retains all packets of a message in the message queue until it receives an End-to-End ACK from the destination with that message's ID. The destination station retains all packets of a message in the message queue until all Nmsg packets have arrived, the message has been delivered, and an End-to-End ACK has been sent.

A station that is neither the originating station nor the destination station of a message packet will retain the packet in the message queue until it has been transmitted to another station and until this transmitting station has received an RTS message from a neighbor containing the data packet message ID which has been sent. This RTS message from the neighbor containing the data packet message ID of the sent data packet is the implied acknowledgement of receipt of the data packet by another station.

A message is delivered at the destination when all packets of that message have been received at the destination and an End-to-End ACK message has been generated.

A station that has one or more data packets waiting for transmission chooses the packet with the shortest time-to-live and broadcasts a Request to Send (RTS) message with information pertaining to that message and a randomly-selected data channel. (If the only available channels all have excessive noise, the channel with the least noise is chosen).

The RTS message includes the following:
a. The unique packet message ID of the data packet to be transmitted (may include a small amount of data). This may be a special "dummy" packet message ID (or may include a dummy destination) in cases where a receiving or destination station of a packet wishes to communicate that it has received the data packet but has no other data to transmit, i.e. there is no reason to transmit a RTS message. This is described in more detail below.
b. The destination station ID of the data packet to be transmitted.
c. The cost to packet destination of the transmitting station.
d. The data channel on which the data will be transmitted.
e. The last Nmsg data packet message IDs received by the transmitting station (excluding the one about to be transmitted). Nmsg is 1 or more and should be large enough to include at least all packet IDs in a single transmission. For example, should it be possible to transmit 20 data packets in a single transmission, then Nmsg should be at least 20. This information is used by receiving stations to determine whether data packets which receiving stations have in their queues can be discarded. This will be described in more detail later.
f. Any ETE ACK (End-to-End Acknowledgement) or ETE NAK (End-to-End Non-acknowledgement) packet IDs held by this station. This may be just a flag associated with packet message IDs in (e).

In Appendix A below further information is provided on RTS messages.

Any packet in the message queue has a status of "Pending" until the transmitting station has received a RTS transmission containing the Nmsg data packet message ID which it has transmitted.

The RTS message is transmitted with enough power to reach close neighbors and also any additional stations from whence it received data packets that are enumerated in the RTS message (see (e) above).

If no data channels are available when trying to transmit a data packet, the Transmit blackout entries are used to determine a suitable time to transmit the RTS. It is necessary to make sure that the intended data transmission does not occur during this station's "off channel" time, if applicable. The actual transmission time for a packet is dependent on the data rate used. If multiple data rates are being used then the time reservation should be based on the lowest such data rate.

At the destination, all packets are collected and re-assembled into the message. Once the entire message has been received, an End-to-End ACK is included in the next RTS message of the destination station. Alternatively, if no outgoing message packets are available for sending, a dummy RTS message is generated by the destination station.

After sending the RTS message, the station switches to the data channel specified in the RTS message and transmits the data packet. This happens unless the RTS message is in fact a dummy RTS message (in which case no transmission will follow). After transmitting the data packet, the station immediately switches back to the probing channel and continues with transmitting a new RTS message to send further data packets.

Whenever a station hears an RTS message on the probing channel, this listening station may take any of the following actions depending on the cost to destination of the transmitting station and listening station, the path/gradient to the destination station, the message queue and a list of recently received data packets (Retained packet list) which is maintained at each station:

Should the listening station have no path/gradient to the destination station, the listening station will do nothing.

In the event that the transmitting station has the same or a lower cost to destination than the listening station, the listening station will again do nothing. However, if the listening station has a copy of the data packet which is being transmitted and the transmitting station has a lower cost to destination, the data packet at the listening station should be discarded.

Where the transmitting station has a higher cost to destination than the listening station and no copy of the data packet to be transmitted has ever existed at the listening station, the listening station will switch to the data channel (if use is made of a separate data channel) and prepare to receive the data. However, should the transmitting station have a higher cost to destination than the listening station but a copy of the data packet to be transmitted already exists at the listening station, the listening station will do nothing. (The data packet ID will already be in the Retained packet list of the listening station)

In the event that the transmitting station has a higher cost to destination than the listening station and a copy of the data packet to be sent previously existed at the listening station, and this station has no data to transmit (therefore would not normally be transmitting RTS messages), the following will occur. The listening station will transmit a "dummy" RTS message with the message information being transmitted with enough power to reach the transmitting station. The "dummy" RTS message is scheduled to be transmitted after the transmitting station has had time to transmit the data packet on a data channel and switch back to the probing channel (if necessary). The "dummy" RTS message will effectively inform other listening stations that the data packet was transmitted but that they should not bother to switch to a data channel to receive data.

Should the transmitting station transmit a RTS message having a "dummy" message ID or destination, the listening station will do nothing.

If the listening station previously transmitted any data packets that exist in the transmitting station's RTS message's list of recently received packets (Retained packet list), the listening station will discard that packet. This is the "implied" acknowledgement of the data packet.

Additionally, if the incoming message contains ETE ACK or ETE NAK packet IDs, and the destination of any of those packet IDs (i.e. the source of the original message packets) is closer (cost to destination) than the transmitting station, then those ETE ACK/NAKs should be added to the next RTS to be transmitted. If no RTS message is scheduled for transmission then a dummy RTS should be transmitted, including those ETE ACK/NAKs.

Once a data packet has been received on a data channel, the station which has received the data packet will switch back to the probing channel (if necessary). The ID of the received packet is then added to the Retained packet list for transmitting in subsequent RTS messages.

If the data packet is destined for the station which has just received it and there are no packets awaiting transmission (i.e. no RTS messages would normally be transmitted), then the station would construct and schedule for transmission a "dummy" RTS message with this packet ID in the received packet list. This dummy RTS message tells the station's neighbors that the packet was received. An ETE ACK entry should also be added in order to inform the originating station that the packet reached its destination.

If a pending data packet (one that has been transmitted) is still pending after a randomized timeout period (say centered around 5 ms), it should be retransmitted as above and the timeout period reset. Note that once the transmitting station hears an RTS message for that packet from any station with a lower cost to destination, or an RTS from any station with a lower cost to destination that has that packet in the recently-received list, the packet should be discarded.

If, after a certain specified timeout period (say 10 transmissions), a data packet is still pending, then it should be abandoned.

If, after a certain specified time, there are missing packets from a message at the destination station of that message, then one or more ETE NAKs should be generated and added to the next outgoing RTS message from the station. If no RTS message is scheduled, then a "dummy" RTS message should be transmitted in order to disseminate the ETE NAKs.

The algorithm above can also be used for broadcasting data to all stations with some simple modifications:

A broadcast packet is transmitted as above (RTS followed by Data). After transmitting a packet the transmitting station keeps the data packet until it has heard RTS transmissions from all of its close neighbors containing the packet ID as either the transmitted packet, or in the recently-received list. Each time it hears an RTS with the ID so included, it adds that information to a list associated with the packet. If, after a suitable interval (say 50 ms), it does not have all of its close neighbors in that list, then the packet should be retransmitted.

A packet of data is transmitted to a neighbor for subsequent transport to the destination. Since the time reservation for the Data message is based on the lowest available data rate, then if a higher data rate is used it might be possible to send two or more packets from the same message (or from a message whose packets have an equal or longer time-to-live and have the same destination) at the higher rate such that the total transmission time is less than or equal to that reserved previously.

Note: if multiple packets are sent in one transmission, additional data uniquely identifying each of the packets must be included in the Data message so that the receiving station can disassemble them.

When the originating station receives the ETE ACK packet, it can release the gradient to/from destination. It should also discard all data packets for the specified message from the message queue. Other receiving or listening stations should queue the message for transmission to the originating station as with normal data packets. If any data packets in the Retained Packet list are part of the specified message, they should be dropped.

If neither an applicable ETE ACK nor an ETE NAK is received by before the time-to-live of the packets in a message expires (plus a suitable wait period for a potential ETE NAK to arrive), then all packets in that message are rescheduled for retransmission.

When the source station specified in the message receives an End-to-End NAK message, it must reschedule the missing data packets for transmission.

If a non-source or listening receiving station has a copy of any of the missing data packets in its Retained packet list, that packet is moved to the message queue and the missing packet references are removed from the ETE NAK message. The ETE NAK is included in the next RTS message for transmission to the source station as with normal data packets unless no missing packet references remain in the message, in which case the ETE NAK is discarded from the RTS message.

If neither an applicable ETE ACK nor an ETE NAK is received before the time-to-live of the packets in a message expires (plus a suitable wait period for a potential ETE NAK to arrive), then reschedule all packets in that message for retransmission.

It will be appreciated that in circumstances where large amounts of data are to be transmitted it may be appropriate to incorporate a Clear to Send (CTS) step in the algorithm. Ordinarily the method of the invention contemplates that the station wishing to send a message sends an RTS and switches to a data channel and sends the data. Stations hearing the RTS also switch to the data channel to receive the transmission after which the stations return to the probing channel. The receiving station then sends a new RTS in respect of the next transmission hop, which provides the implied acknowledgement to the initial station that sent the transmission. Until this implied acknowledgement is received the initial station retains the data for possible retransmission.

However, where large amounts of data are to be sent it may be appropriate to require listening stations to send a CTS in order to let the station wishing to send the message know that there is a station ready to receive the transmission. This has the advantage that the station avoids wasting time switching channels and sending data when no stations are available to receive the data. However, the disadvantage is that the station wishing to send data must waste time in waiting for and processing the CTS messages received.

The process thereafter is as described above, namely the station wishing to send the data and stations sending the CTS switch to the data channel and the initial sending station will receive an implied acknowledgement when the receiving station sends out an RTS of its own.

In the above method, it should be appreciated that many CTS messages may be received. Consequently, to reduce the time taken, the RTS sent out could include data specifying certain criteria that limits the need for stations to return a CTS. For example, the list of stations that are permitted to answer may be specified; or other requirements may be provided for a response, for example that only the stations hearing the RTS that have a lower cost to destination are to respond. Moreover, once processed at the station wishing to send the message data, the data transmitted can be limited to a subset of the stations that had responded with a CTS.

It will be appreciated that similar protocols as discussed above can be used for stations that define only a probing channel. This is useful, in particular for short data packets that can be sent on the probing channel. In such a network, stations would have no need to switch between channels.

Appendix A

Parameters nRTSPackets: the maximum number of packets reported in the Packets

RTS

Broadcast status. This is a Boolean value that specifies that the data to be sent is to be broadcast.

Packets available range. A range of packets that the transmitting station is offering. These are all packets in the given message.

ETE required. True if the originating station requires stations on the network to send an ETE acknowledgement when the broadcast message is completely received.

Psize: Packet size (bits). Maximum length of a data packet to be sent in one transmission (excluding overhead data). If a message block is longer than Psize then the block is broken into two or more packets. Psize should be chosen for the slowest data rate.

Pmax: Maximum number of packets for Slow Switching transmission. If the number of packets waiting to be transferred via a particular neighbor is Pmax or fewer, then the packets are transmitted on the probing channel. If the number of packets exceeds Pmax, the data is transmitted on a data channel. (Slow Switching algorithm only.)

TTL: Message Time-to-Live (msec): Time-to-live for packets in a message. A packet's time-to-live is initially set to TTL when it is generated. If a packet's time-to-live drops to zero before delivery to its destination, it is discarded (it is assumed that other mechanisms described here will force retransmission of the discarded packet if necessary).

Tnak: Message Time to NAK (msec). Less than TTL. After this time, if a packet at the destination reaches this age, an End-to-End NAK will be generated to retrieve missing packets.

Tretain: Time to retain non-targeted data packets in the Retained packet list (msec).

Tack: Maximum time to wait for an ACK after transmitting a Data message (msec).

Data Structures

Message Queue

Consists of an entry for each data packet awaiting transmission.

Entry consists of:

Data Packet, including source ID, packet ID, Time-to-live

Status: One of: Awaiting transmission, Awaiting implied acknowledgement, Awaiting ETE ACK/NAK Retained Packet List Consists of an entry for each data packet received by a station.

Entry consists of:

Data Packet, including source ID, packet ID, Time-to-live

Time that data packet was retained.

Blackout Period List

Contains an entry for each period during which a known Data transmission is scheduled and whether that known transmission will interfere with reception or will potentially be interfered with by transmissions. The rules are:

If a station A hears an RTS (on the probing channel) from station B then that RTS will define a time, duration and channel for a (possible) subsequent DATA transmission from station B. Station A must avoid scheduling any receptions during that time (i.e. must not respond to other RTS messages if the scheduled time overlaps) to avoid interference. This is a Receive blackout.

Entry consists of:

Receive. Specifies that this is a Receive blackout.

Start time (relative to station clock)

Duration of transmission (msec).

Transmitting station ID for Receive blackouts.

Transmit channel.

Off Channel Time

This is a variable that specifies that this station will be "off channel" during a specified period of time (i.e. will be listening on a data channel rather than the probing channel). Not applicable if a single channel is being used for both the probing and data channel.

Transmitted Message Formats

All messages start with the usual Transmitting station ID, Transmit power and Transmit station noise floor for the channel on which the message is being transmitted. This information is used to identify the transmitter and update entries in the neighbor table, although none of these messages should be used to create new neighbors—that task is restricted only to neighbor (slow) probe messages. The relevant ODMA methodology, particularly with regard to the use of neighbor tables and gradient tables, is described in detail in International patent application no. PCT/IB2004/004111 entitled Probing Method for a Multi-Station Network, the content of which is incorporated herein by reference.

Each message also contains a field specifying the Cost Function ID. This will determine which gradient table is used to route messages (see the Fast Probing document for more information). Typically this Cost Function ID is chosen when the message is generated in order to control Quality of Service (QoS) for that message type. Subsequently derived messages (e.g. RTS, etc.) will inherit the same Cost Function ID as the originating message.

Note: In multi-channel systems, only the messages sent on the probing channel should be used to update the neighbor table entries. Messages on data channels should not update the neighbor table information.

RTS Contents
Unique message ID of data packet to be transmitted.
Originating station ID of data packet to be transmitted.
Packet number of data packet to be transmitted.
(Note: the unique message ID (unique to originating station), together with the originating station ID and packet number, uniquely identifies the packet within the system)
Destination station ID of data packet to be transmitted.
Data packet time-to-live.
Data packet random number*.

*This random number would typically be a short (8-bit) random integer, generated for this RTS message from a random number generator, initially seeded with (say) the station's unique ID at startup. This number is used to prioritize two RTS messages with equal time-to-live data, as explained below.

Data packet transmit size.
Data packet transmit time (projected).
Data transmit channel.
Noise floor of data transmit channel.
Cost to packet destination of transmitting station. (Note: if the gradient for the destination is frozen, send $C_{DF}$ rather than $C_D$)

The last Nmsg data packet message IDs received by the transmitting station (excluding the one about to be transmitted). Nmsg is 1 or more and should be large enough to include at least all packet IDs in a single transmission. For example, should it be possible to transmit 20 data packets in a single transmission, then Nmsg should be at least 20. This information is used by receiving stations to determine whether data packets which receiving stations have in their queues can be discarded. This will be described in more detail later.

Any ETE ACK (End-to-End Acknowledgement) or ETE NAK (End-to-End Non-acknowledgement) packet IDs held by this station.

End-to-End ACK
This is a single packet message with a special flag signifying that it's an ETE ACK. It is targeted at the data message originating or source station.

The message packet itself contains:
Unique message ID of message that was successfully received at the destination.

End-to-End NAK
This is a short message with a special flag signifying that it is an ETE NAK. It is targeted at the data message source station. The message packet itself contains:
Unique message ID of message that was unsuccessfully received at the destination.
A list of packet numbers that were not received successfully.

The invention claimed is:

1. A method of operating a communication network comprising a plurality of stations each able to transmit and receive data so that the network can transmit a message from an originating station to a destination station via at least one opportunistically selected intermediate station, the method comprising:

i. transmitting probe signals from each station, other stations which receive the probe signals from a probing station responding directly, or indirectly via other stations, to indicate to the probing station their availability as destination or intermediate stations;

ii. from a station with data to send, transmitting a probe signal comprising a Request to Send message to other available stations, the Request to Send message indicating a need to send data to a particular destination station or stations and including identification information relating to data received previously for onward transmission by the station with data to send;

iii. from said station with data to send, transmitting data opportunistically to reach an available station or stations for onward transmission to said destination station or stations; and iv. from a station receiving said data for onward transmission, transmitting a further probe signal comprising a Request to Send message including identification information relating to said data, thereby to provide an implied acknowledgement of the received data to the station with data to send and also to other available stations.

2. A method according to claim 1 wherein, when the station with data to send transmits said probe signal comprising a Request to Send message, only stations having a lower cost to destination than the station with data to send responding to said probe signal to indicate their availability as destination or intermediate stations.

3. A method according to claim 2 wherein, if a station with a higher cost to destination hears a Request to Send message from another station with a lower cost to destination, relating to the same data, it will treat the data as acknowledged.

4. A method according to claim 1 wherein the method is adapted for use in a network comprising a plurality of client stations and one or more gateways arranged to serve as access points to the network for client stations.

5. A method according to claim 4 wherein the method is adapted for use in a network that includes a plurality of seed stations with which client stations and/or gateways can communicate, the plurality of seed stations extending the effective connectivity range of the client stations.

6. A method according to claim 5 wherein the network further includes at least one subscriber network manager for monitoring the activity of the client stations.

7. A method according to claim 1 wherein the message data transmitted from the originating station comprises a plurality of data packets.

8. A method according to claim 1 including selecting, at each station, a probing channel distinct from one or more data channels for the transmission of probe signals to other stations.

9. A method according to claim 8 wherein the Request to Send messages include message data so that stations may effectively communicate information via the mechanism of probe signals transmitted on said probing channel, without having to transmit data on a data channel.

10. A method according to claim 9 wherein the message data included in Request to Send messages comprises a relatively small or limited amount of data compared with the amount of data in data transmissions on a data channel.

11. A method according to claim 10 wherein the message data included in Request to Send messages comprises high priority message data.

12. A method according to claim 1 wherein the Request to Send message sent by the station receiving said data for onward transmission comprises dummy information where the receiving station has no message data to send requiring a Request to Send message, thereby to provide an implied acknowledgement of the received data to the station with data to send.

13. A method according to claim 1 including transmitting, from each destination station which has received all data packets of a message, an End-to-End Acknowledgement to the originating station, contained in a Request to Send message.

14. A method according to claim 13 wherein each originating station retains all the data packets of the message until the originating station receives the End-to-End Acknowledgement from the destination station.

15. A method according to claim 14 wherein each destination station retains all the data packets of the message until the destination station transmits the End-to-End Acknowledgement to the originating station.

16. A method according to claim 1 wherein each station with data to send retains at least one data packet until the station with data to send has transmitted said at least one data packet to a receiving station and until the receiving station confirms successful reception of the transmitted data packet by transmitting a Request to Send message containing information relating to said transmitted data packet.

17. A method according to claim 8 wherein, where a station has a large amount of data to send, it transmits a Request to Send message requesting an available station to send a Clear to Send message in order to notify the station with data to send that there is a station ready to receive the transmission, the station with data to send and the station sending the Clear to Send message switching to a data channel for transmission of the data.

18. A method according to claim 17 wherein said Request to Send message includes data specifying criteria limiting the need for other stations to return a Clear to Send message.

19. A method according to claim 18 wherein the criteria include one or more of: a list of stations that are permitted to answer; and a requirement that only stations receiving said Request to Send message that have a lower cost to destination than the station with data to send are to respond.

20. A communication network comprising a plurality of stations each able to transmit and receive data so that the network can transmit a message from an originating station to a destination station via at least one opportunistically selected intermediate station, wherein each station in the network is adapted to:
  i. transmit probe signals, other stations which receive the probe signals from a probing station responding directly, or indirectly via other stations, to indicate to the probing station their availability as destination or intermediate stations;
  ii. transmit a probe signal comprising a Request to Send message to other available stations when the station has data to send, the Request to Send message indicating a need to send data to a particular destination station or stations and including identification information relating to data received previously for onward transmission by the station with data to send;
  iii. transmit said data opportunistically to reach an available station or stations for onward transmission to said destination station or stations; and
  iv. transmit a further probe signal comprising a Request to Send message including identification information relating to said data when the station receives data for onward transmission, thereby to provide an implied acknowledgement of the received data to the station with data to send and to other available stations.

* * * * *